United States Patent [19]
Muraishi et al.

[11] Patent Number: 5,785,292
[45] Date of Patent: Jul. 28, 1998

[54] LONG SLIDE RAIL FOR VEHICLE SEAT

[75] Inventors: Shozo Muraishi; Tamotsu Shirai, both of Akishima, Japan

[73] Assignee: Tachi-s Co., Ltd., Tokyo, Japan

[21] Appl. No.: 711,294

[22] Filed: Sep. 6, 1996

[51] Int. Cl.$^6$ .................................................. A62B 35/00
[52] U.S. Cl. ......................... 248/429; 248/430; 248/432; 297/216
[58] Field of Search ........................... 248/429, 430, 248/432, 186.1; 297/216; 296/68.1

[56] References Cited

U.S. PATENT DOCUMENTS

| | | | |
|---|---|---|---|
| 4,804,229 | 2/1989 | Nishino | 248/430 |
| 4,941,636 | 7/1990 | Fujiwara et al. | 248/430 |
| 5,100,092 | 3/1992 | Sovis | 248/429 |
| 5,106,144 | 4/1992 | Hayakawa et al. | |
| 5,167,393 | 12/1992 | Hayakawa et al. | 248/430 |

FOREIGN PATENT DOCUMENTS

| | | | |
|---|---|---|---|
| 0241223 | 10/1986 | Japan | 248/429 |
| 0148632 | 6/1989 | Japan | 248/429 |
| 7-21425 U | 4/1995 | Japan | . |
| 7-195966 | 8/1995 | Japan | . |
| 7-195967 | 8/1995 | Japan | . |

Primary Examiner—Victor N. Sakran
Attorney, Agent, or Firm—Browdy and Neimark

[57] ABSTRACT

A long slide rail for use in a vehicle seat, which comprises an elongated or long lower rail member, an upper rail member slidably fitted in the long lower rail member and a locking mechanism. In the locking mechanism, a swing linkage is provided, which extends alongside of the upper rail member and has one end connected to a lock plate slidably mounted in the same upper rail member. Thus, both swing linkage and lock plate are arranged within area of the upper rail member, avoiding projection therefrom, which lowers the seating surface of seat to a comfortable level.

12 Claims, 2 Drawing Sheets

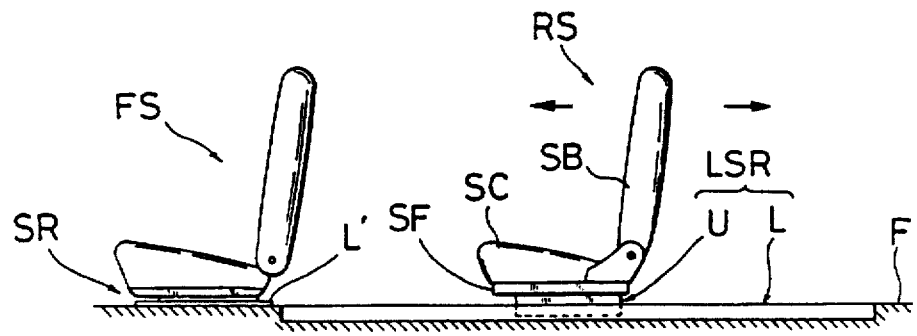
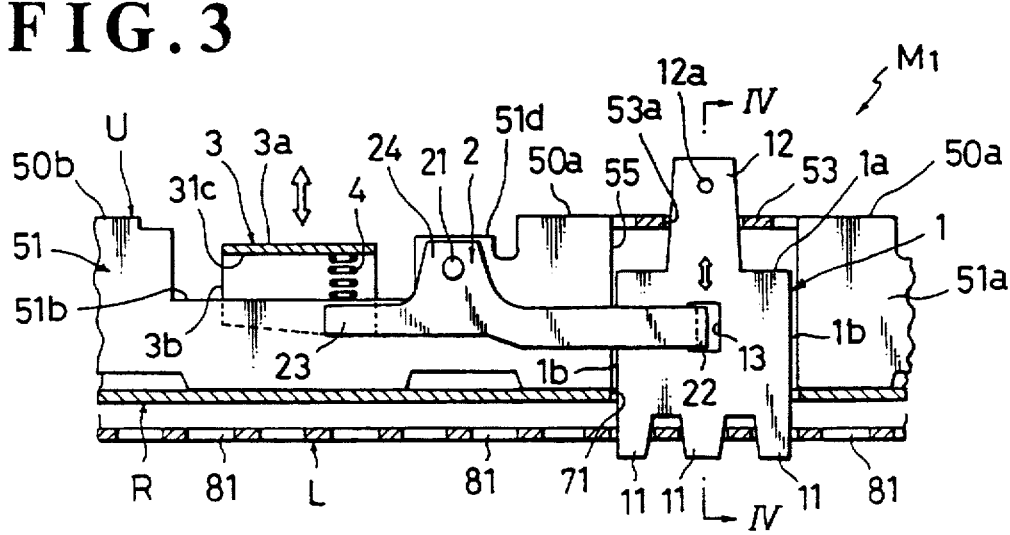
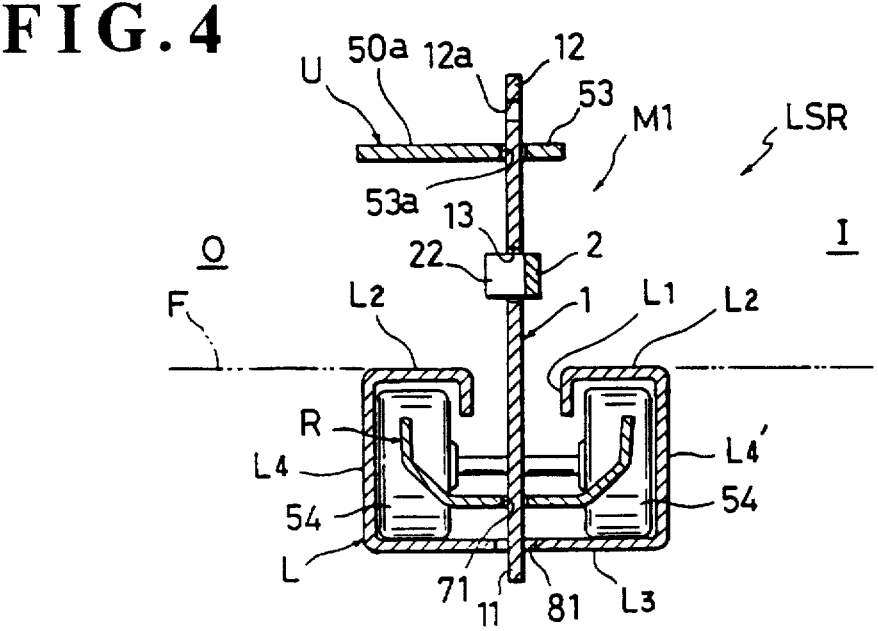

5,785,292

LONG SLIDE RAIL FOR VEHICLE SEAT

BACKGROUND OF INVENTION

1. Field of the Invention

The present invention relates to a long slide rail for use with a rear seat or plural rear seats (including the so-called second and third seats) in the rearward cabin section or load-carrying platform of a van-type or sedan-type vehicle or automobile for adjustment in position of the seats in the longitudinal direction thereof or the fore-and-aft direction of vehicle.

2. Description of Prior Art

A long slide rail is constructed in an elongated fashion relative to an ordinary slide rail used in one single vehicle seat, so that it may be mounted in a wide space behind a front seat, as with such van or sedan type of vehicle, for allowing one or plural rear seats to adjustably slide thereon in the fore-and-aft direction of the vehicle. Generally, in this long slide rail, an elongated or long lower rail member is provided, which extends on a floor in the rearward section (or load-carrying platform) of the vehicle in the whole length thereof, and an ordinary short size of upper rail member fixed at the seat is slidably fitted in such long lower rail member. For instance, reference is made to FIG. 1 which shows a typical long slide rail of this kind provided in a rearward space of a vehicle. The rear seat (RS) is shown to have a short ordinary upper rail member (U) slidably fitted in a long lower slide rail member (L) fixed on a floor (F) behind a front seat (FS), so that the rear seat (RS) may be adjusted at a desired position in the fore-and-aft direction of vehicle.

The conventional structure of long slide rail has been disclosed in the Japanese Laid-Open U.M. Pub. No. 7-40251. According thereto, in particular, a locking device in that long slide rail, which is operable to lock or unlock an upper rail member relative to a long lower rail member, is of the construction wherein a lock plate is mounted at the upper rail member for vertical movement towards and away from a selected one of plural lock holes formed in the lower rail member, to thereby provide a locking/unlocking action between the upper and lower rail members. The locking device includes an unlocking mechanism independently of the lock plate, which is mounted at the lower end area of seat frame and thus situated above the upper rail member. Operating the unlocking mechanism causes the lock plate to move upwards out of locking engagement in the lock hole so as to unlock the upper rail member from the lower rail member, thus permitting for free fore-and-aft sliding of the seat along the long lower rail member.

However, in this conventional slide rail, the fact that its unlocking mechanism is located above the upper rail member has been found defective in increasing the height of the lower area of the seat and resulting in an undesired raise of seating surface of the rear seat, which reduces a space between the ceiling of the vehicle and rear seats, and also makes it uneasy for a passenger to climb onto the rear seat or gives an uncomfortable seating touch to him or her.

SUMMARY OF THE INVENTION

In view of the above-stated drawbacks, it is therefore a primary purpose to provide an improved long slide rail for a vehicle seat which permits for lowering the seating surface or level of the seat mounted thereupon.

In order to achieve such purpose, a long slide rail in accordance with the present invention is basically comprised of:

an elongated lower rail means to be fixed on a floor of a vehicle;

an upper rail means to be fixed to the vehicle seat, the upper rail means being slidably fitted in the elongated lower rail means; and a locking means for locking and unlocking the upper rail means relative to the elongated lower rail means, which locking means includes:

a lock plate means movable in the upper rail means so as to lockingly engage and disengage from the elongated lower rail member;

a swing linkage means provided along a longitudinal direction of the upper rail means, the swing linkage having a center of rotation pivoted to the upper rail means, one end portion connected to the lock plate means and another end portion, such that acting on such another end portion causes the afore-said one end portion to swing relative to the center of rotation, thereby bringing the lock plate means into and out of locking engagement with the elongated lower rail means; and a lock control means for controlling and actuating the swing linkage means and lock plate means, which lock control means is operatively connectable with the foregoing another end portion of swing linkage.

Accordingly, the locking means on the whole is disposed in and alongside the upper rail means and does not project thereabove, with the lock control means disposed externally of the upper rail means, which lowers the seating surface of seat, providing a comfortable seating condition without the above-stated problems of prior art.

In one aspect of the present invention, the upper rail means includes a horizontal portion for connection with the seat and a vertical portion slidably fitted in said elongated lower rail member, with the swing linkage means provided alongside of and in a longitudinal direction of the vertical portion.

Preferably, a cut-away region may be formed in an upper edge of such vertical portion, and the foregoing another end portion of swing linkage means be provided with a guide member of a generally inverted-U-shaped cross-section, with such an arrangement that the guide member is slidably fitted over said cut-away region. Importantly, the upper wall of guide member is situated below said upper edge of said vertical portion.

It may be so arranged that when the lock plate is brought out of the locking engagement with the elongated lower rail means, the upper wall of said guide member is contacted with the upper edge of vertical portion to limit a further excessive movement of lock plate means above the upper edge of vertical portion.

Preferably, a biasing means may be interposed between the guide member and upper edge of said vertical portion so as to normally bias the swing linkage means towards a direction in which such another end portion of swing linkage means is swung to cause the locking engagement of lock plate means with the elongated lower rail means.

Preferably, a guide spacing may be formed in the vertical portion of upper rail means, so that the lock plate is slidably fitted within the guide spacing for vertical motion into and out of locking engagement with the lower rail means. Also, the lock plate may have a thickness equal to that of the upper rail means vertical portion so as to establish a coplanar relation therewith.

Other features and advantages of the present invention will become apparent from reading of the descriptions hereinafter, with reference to the annexed drawings.

BRIEF DESCRIPTION OF THE DRAWINGS

FIG. 1 is a schematic diagram showing the state where a long slide rail in accordance with the present invention is used in a rear seat within a vehicle;

FIG. 3 is a schematic fragmentary sectional view of a principal part of the long slide rail; and FIG. 4 is a schematic sectional view taken along the line IV—IV in FIG. 3.

DETAILED DESCRIPTION OF PREFERRED EMBODIMENT OF THE INVENTION

Figure 2:
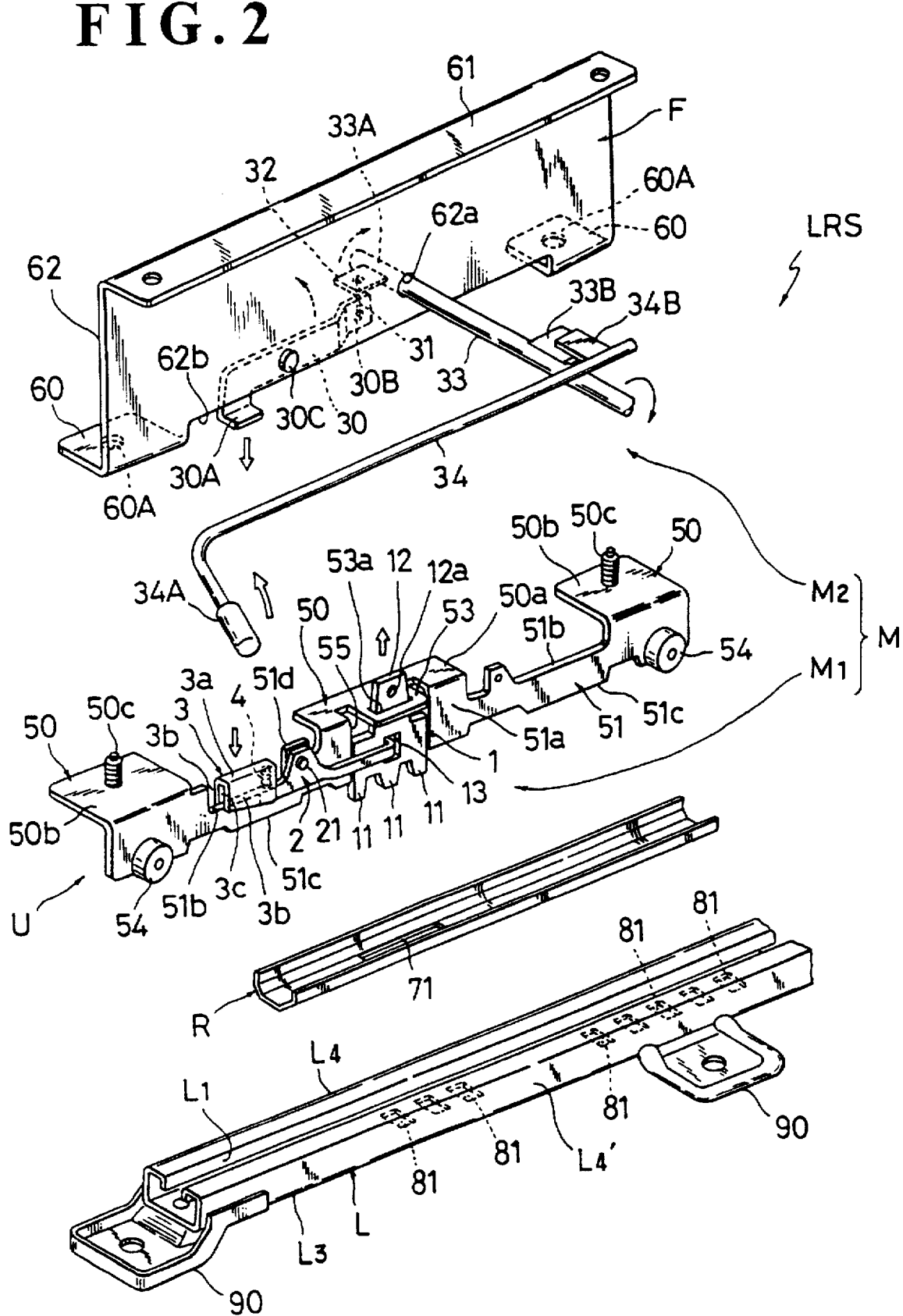
FIG. 2 is a partly broken schematic exploded perspective view of the long slide rail.

Referring to FIGS. 1 through 4, there is illustrated a long slide rail in accordance with the present invention, as generally designated by (LSR), which typically includes an elongated or long lower rail member (L) and an upper rail member (U). The long lower rail member (L) is fixed in the floor (F) of a vehicle, while on the other hand, the upper rail member (U) is fixed to a seat frame (SF) of seat cushion (SC) of a rear seat (RS).

Although not shown, as with the common arrangement of slide rails in the art, it may be understood that a pair of such long slide rails (LSR) are provided between the rear seat (RS) and floor (F). The illustrations in the drawings show only one long slide rail (LSR) to simplify the figures thereof since description will also be given as to only one long slide rail (LSR) for the sake of simplicity. The same goes for the upper rail member (U) fitted in the lower rail member (LSR).

FIG. 1 shows, in the side elevation, a general whole appearance of the long slide rail (LSR) arranged in a vehicle or automobile. It is seen therefrom that, as already stated earlier, the lower rail member (L) is of a substantive length greater than that (L') of an ordinary slide rail (SR) used in a front seat (FR), and that the long slide rail (LSR) permits the rear seat (RS) (or plural rear seats) to be adjustably moved in a space behind the front seat (FS), i.e. in a rearward cabin section (or load-carrying platform) of a vehicle, along the fore-and-aft direction of vehicle as indicated by the arrows.

Now, reference being particularly made to FIGS. 2 to 4, more specific description will be made of the long slide rail (LSR). As shown in FIGS. 2 and 4, the long lower rail member (L) has a generally U-shaped cross-section, comprising a pair of spaced-apart upper guide walls (L2)(L2), a guide groove (L1) defined therebetween and a pair of outward and inward lateral walls (L4)(L4'). In this respect, it is to be understood from FIG. 4, that the outward lateral wall (L4) faces towards a side (O) outwardly of the seat (RS), and the inward lateral wall (L4') faces towards a side (I) inwardly of the same seat (RS). A plurality of lock holes (81) are perforated in the bottom wall (L3) of this lower rail member (L). Designations (90) denote support leg members fixed in the floor (F) of vehicle for supporting the lower rail member (L) fast in the floor (F).

The upper rail member (U) is basically formed by bending a rigid plate material into an "L" shape in cross-section such as to have a vertical portion (51) adapted for slidable insertion in the foregoing guide groove (L1) of lower rail member (L) and a horizontal portion (50), constituting a plane for connection with a seat frame (SF) associated with the seat cushion (SC) (See FIG. 1). More specifically, according to the embodiment shown, the upper rail member (U) is cut and configured in such a fashion that the vertical portion (51) is formed with a central vertical region (51a) and a pair of spaced-apart cut-away lowered regions (51b) (51b), while the horizontal portion (50) is formed with a central horizontal region (50a) and a pair of spaced-apart horizontal connecting regions (50b)(50b).

With respect to the vertical portion (51) of upper rail member (U), the two cut-away regions (51b)(51b) are defined in the upper edge thereof, and the opposite lower edge (51c) thereof is for firm fixation to a reinforcing member (R). The reinforcing member (R) is shown as being separated from the upper rail member (U) to facilitate understanding of its whole appearance in the exploded perspective view of FIG. 2, from which it is observed that a slit (71) is formed in that reinforcing member (R) for allowing the lock plate (1) to pass therethrough (See FIG. 3 as well). Hence, the reinforcing member (R) is fixed integrally to the lower edge (51c) of upper rail member (U) and adapted to prevent the upper rail member (U) against removal from the lower rail member (L) when a great upward force is exerted on the upper rail member (U). Also, as shown, a pair of coplanar vertical widened regions, in which rollers (54) are provided rotatably, are defined in the forward and backward ends of upper rail member (U), respectively. The central vertical portion (51a) is cut midway in the vertical direction thereof from the upper edge (at 50a) to the lower edge (51c) of vertical portion (51) such as to define a guide spacing (55) therein, in which a lock plate (1) is movably provided as will be described later. The vertical portion (51) further includes a bearing region (51d) raised from the cut-away region (51b), in which bearing region, a swing linkage (2) is carried rotatably as will be described in detail.

Each of the horizontal connecting regions (50b)(50b) in the lower rail member horizontal portion (50) has a connecting screw (50c) erected fast thereon. The central horizontal region (50a) is formed integrally with a support plate part (53) which extends on the same plane therewith in a direction opposite to the direction in which the central horizontal region (50a) extends. This can be best seen from FIG. 4 in conjunction with FIG. 2, from which it is observed that all the horizontal regions (50a, 50b) extend towards the outward side (O), whereas the support plate part (53) projects from the vertical plane of vertical portion (51) towards the inward side (I). With this arrangement, a guide hole (53a) is so perforated in that support plate (53) as to not only generally align with the longitudinal direction of vertical portion (51) but also generally align with the vertical direction of guide spacing (55), so that a lock plate (1) is disposed in a coplanar relation with the vertical portion (51), which will be elaborated later.

As understandable from FIGS. 1, 3 and 4, the upper rail member (U) is slidably fitted in the lower rail member (L), such that the vertical portion (51) of upper rail member (U) is partway slidably inserted in the lower rail member (L) via the groove (L1), with the rollers (54) and reinforcing member (R) accommodated movably within the lower rail (L) as shown in FIG. 4.

Further, in accordance with the present invention, there is provided a locking mechanism (M) in the above-described long slide rail (LRS). As shown in FIG. 2, the locking mechanism comprises a lock action assembly (M1) and a lock control assembly (M2). The lock action assembly (M1) is essentially composed of: the lock plate (1) for locking engagement in the lock holes (81); the swing linkage (2) having one end portion (22) connected to the lock plate (1); and a guide member (3) fixed to another end portion (23) of the swing linkage (2). The lock plate (1) is formed from a rigid plate into the illustrated shape having an upward narrow part (12) and a main widened part which has a horizontal shoulder edge (1a), two lateral edges (1b)(1b) and plural lock teeth (11) (three lock teeth) formed at the lower edge thereof. The lock plate (1) itself has a thickness generally equal to that of the upper rail member (U), and is therefore slidably fitted in both guide hole (53a) and guide spacing (55) described above such as to have a coplanar relation with the vertical portion (51) of upper rail member (U). Of course, the guide hole (53a) and guide spacing (55) are formed in sizes and dimensions slightly greater than the upward part (12) and main part (1a, 1b, 11) of lock plate (1), respectively, to permit the lock plate (1) to move therein in the vertical direction as indicated by the arrow in FIG. 2. The lock plate (1) has a connecting hole (13) formed therein, in which is connected the swing linkage (2) for interlocking with the lock plate (1).

The swing linkage (2) has a pivot area (24) defined centrally thereof, a straight end portion (23) defined at one end thereof and a right-angled end portion (22) defined at another end thereof. The swing linkage (2) is pivotally mounted at the inward surface of upper rail member vertical portion (51) which faces towards the side (I) inwardly of seat (RS) as in FIG. 4. More specifically, the pivot area (24) of swing linkage (23) is rotatably connected via a pin (21) to the inward side of bearing region (51d) of upper rail member vertical portion (51), so that the swing linkage (2) is bodily attached at such inward side (I), extending alongside of the upper vertical portion (51) in the longitudinal direction thereof, as seen in FIGS. 2 and 3. The right-angled end portion (22) of swing linkage (2) is fitted in the connecting hole (13) of lock plate (1). On the other hand, fixed to the straight end portion (23) of swing linkage (2) is the guide member (3) which has a generally "inverted U" shape in cross-section. The guide member (3) has an upper wall (3a) and a pair of side walls (3b)(3b), with a guide groove (3c) defined therein. The guide groove (3c) is of a dimensions for allowing entry therein of a part of the upper rail member vertical portion (51). In other words, the guide groove (3b) is of a width slightly greater than the thickness of that vertical portion (51), and thus, as best seen from FIG. 2, the guide member (3) is so disposed as to bridge over the cut-away lowered portion (51b) of upper rail member vertical portion (51), so that the guide member (3) may be displaced vertically along the height-wise direction of that vertical portion (51) as indicated by the arrow in FIG. 2.

As shown in FIG. 3, a compression spring (4) is provided in the groove (3c) of guide member (3), such that the spring (4) is interposed between the edge of cut-away portion (51b) and the upper wall (3a) of guide member (3), to thereby normally bias the guide member (3) in the upward direction away from the upper rail member (U). This upward biasing of spring (4) further biasingly causes the swing linkage (2) to rotate about the pin (21) in the clockwise direction, as viewed in FIG. 3, to keep the lock plate (1) lowered towards the lower rail member (L), thereby retaining the three lock teeth (11) in the state engaged in the respective three selected ones out of the plural lock holes (81). Thus, in this case, the upper rail member (U) is locked at a given position relative to the long lower rail member (L). Under such locked state, it is important that the guide member (3) should be stopped, with its upper wall (31a) laying generally below and in parallel with a plane of the horizontal portion (50) of upper rail member (U), as can be seen in FIGS. 2 and 3.

Accordingly, upon the guide member (3) depressed against the biasing of spring (4), the swing linkage (2) is rotated about the pin (21) counterclockwise to swing the right-angled end portion (22) thereof upwardly, whereby the lock plate (1) is moved upwards through the guide hole (53a) and guide spacing (55), releasing the lock teeth (11) out of engagement in the lock holes (81). With this operation, the upper rail member (U) is unlocked from the long lower rail member (L) and free to slide therealong toward a desired position.

As a means for actuating the guide member (3), the embodiment in FIG. 2 suggests employing the lock control assembly (M2). This mode applies to the case where a base frame (F) is attached between the above-described long slide rail (LRS) and the seat frame (SF) of seat (RS), as may be required for a particular seat construction. Therefore, the illustrated assembly (M2) is not limitative in the present invention, but any other lock control assembly or mechanism may be arranged in the long slide rail (LRS) in a proper manner to depress the guide member (3) insofar as it fulfills the purposes of the present invention.

The lock control assembly (M2) is operatively connected via the base frame (F) to the lock action assembly (M1), with such construction wherein an operation knob (34A) disposed adjacent to the seat back (SC) may be handled to actuate the rotary lever (30) to depress the guide member (3). Specifically, in this assembly (M2), a control spindle (34) is disposed inwardly of the slide rail (LRS) (i.e. at (I)) for revolution by the operation knob (34A) to rotate an actuator wing (34B) which is fixed on the base end of control spindle (34). A rotary shaft (33) passes through the vertical wall (62) of base frame (F), terminating in an outward end (33A) having one transmission wing (32) outwardly of the frame (F), while extending its shaft body inwardly of the frame (F) in a direction to intersect the control spindle (34). Another transmission wing (33B) is fixed on the rotary shaft (33) at a point right under the actuator wing (34B) of control spindle (34). Designation (62a) denotes a bearing hole in which the rotary shaft (33) is rotatably supported. The rotary lever (30) is rotatably secured via a pin (30C) at the side outwardly of the base frame (F), such that the horizontal actuator end (30A) of lever (30) is disposed under the lower end (62b) of frame (F), while the connecting end (30B) of lever (30) is coupled via a wire (31) to the transmission wing (32) of rotary shaft (33). Accordingly, controlled rotation of the operation knob (34A) is transmitted to the rotary lever (30), causing vertical motion of the actuator end (30A) of that lever (30).

The base frame (F), as mentioned above, is used for interposition between the long slide rail (LRS) and the seat frame (SF), which consists of a vertical body (62), an upper connecting flange part (61) extending horizontally from the upper end of the vertical body (62) toward the inward side (I) of slide rail (LSR), and a pair of connecting flange parts (60)(60) extending horizontally from the lower end of vertical body (62) toward the outside (O) of slide rail (LSR). An upwardly cut-away portion (62b) is formed in the lower end of frame (F) between the two connecting flange parts (60) (60). Designation (60A) denotes a hole formed in each of the two connecting flange parts (60)(60), through which hole, each securing screw (50c) of upper rail member (U) passes for firm connection of both base frame (F) and upper rail member (U).

Firm connection of the base frame (F) to the upper rail member (U) is such that the two connecting flange parts (60)(60) of the former (F) are juxtaposed with the two connecting horizontal portions (50b)(50b) of the latter (U), respectively, while the two securing screws (50c)(50c) passes through the respective two holes (60A), and then two nuts (not shown) are threadedly fastened to the two screws (50c), respectively. In this connecting procedures, a care is taken to insure that the actuator end (30A) of rotary link (30)

associated with the lock action assembly (M1) is contacted with the upper wall (3a) of guide member (3) associated with the lock action assembly (M1). On the other hand, the upper flange part (61) of base frame (F) is firmly fastened as by a securing bolt to the seat frame (SF) provided under the seat back (SB) of rear seat (RS).

In operation, if it is desired to unlock the upper rail member (U) from the long lower rail member (L), the operation knob (34A) is rotated upwardly as indicated by the arrow in FIG. 2. Then, the control spindle (34) is simultaneously revolved so as to cause its actuator wing (34B) to push the transmission wing (33B) downwards, which in turn causes rotation of the shaft (33) to turn its another transmission wing (32) upwards, thereby raising the end (30B) of rotary link (30). In response thereto, the rotary link (30) is caused to rotate about the pin (30C) counterclockwise as in FIG. 2 so that the actuator end (30A) of rotary link (30) is lowered to depress the guide member (3) of lock action assembly (M1). Consequently, the swing linkage (2) is rotated about the pin (21) against the biasing force of spring (4) in the counterclockwise direction to thereby swing its end (22) upwardly, with the result that the lock plate (1) is raised along the guide spacing (55) to release the lock teeth (11) out of engagement in the lock holes (81), whereupon the upper rail member (U) is unlocked from the lower rail member (L).

It is noted that the groove (3c) of guide member (3) should be of such a depth to provide a range within which the lock plate (1) is vertically moved for complete engagement and disengagement of its lock teeth (11) in and from the lock holes (81). Of course, for that purpose, the distance between the support plate part (53) and shoulder edge (1a) of lock plate (1) should correspond to that depth of guide member groove (3c). Further, in this context, it is so arranged that, when the guide member (3) is depressed, the upper wall (3a) of guide member (3) is contacted with the upper edge (51b) of upper rail member vertical portion (51) to limit further excessive upward movement of the shoulder edge (1a) of lock plate (1) above the horizontal portion (50 or 50a) of upper rail member (U). Of course, the support plate part (53) also acts to limit such excessive upward movement of the lock plate shoulder edge (1a) above the horizontal portion (50a).

It is appreciated here that the guide hole (53a) lies along the boundary between the horizontal and vertical portions (50)(51) of upper rail member (U) and therefore, the projection of the upper portion (12) above the horizontal portion (50) does not interfere with connection between the base frame (F) (or seat frame (SF)) and the horizontal portion (50). However, such upper portion (12) may not be formed in the lock plate (1) and the lock plate (1) may only have the main part (at 1a, 1b, 11), in which case, a proper guide portion equivalent to the support plate part (53) and guide hole (53a) may be formed at the central vertical region (51a) such as to bridge the guide spacing (55).

The lock plate (1) has a connecting hole (12a) formed in the upper portion (12) thereof. In accordance with the present invention, instead of the lock control assembly (M2), a control wire (not shown) may be connected in that hole (12a) of lock plate (1) and the wire be pulled by a suitable operation handle (not shown) so as to forcibly raise the lock plate (1) for disengagement of the lock teeth (11) from the lock holes (81). Thus, any other lock control element and device may be applied to the lock action assembly (M1) insofar as they are able to be connected with either of the guide member (3) and the upper portion (12) (or the hole 12a) of lock plate (1).

It is also noted that, in the case where the base frame (F) is not attached between the seat frame (S) and slide rail (LSR), the two connecting horizontal regions (50)(50) of upper rail member (U) may be directly fixed to the seat frame (SF) of seat (RS), with the abovementioned other suitable lock control means (not shown).

As constructed above, it is to be appreciated that the the locking mechanism (M) may be attached to the upper rail member (U) within the height-wise width thereof, thus avoiding upward projection of the locking mechanism from the upper rail member (U) as found in the prior art and reducing a height of seating surface of seat (RS). In particular, the inverted-U-shaped cross-section of guide member (3) effectively permits an operation force from the knob (34A) to be transmitted along the thin thickness of upper rail member vertical portion (51) and minimizes the projection of guide member (3) per se in both upward and lateral directions from the upper rail member (U). Further, the planar swing linkage (2) extends within the height-wise width of and alongside of that vertical portion (51), and the lock plate (1) is set within the thickness of the same vertical portion (51) to provide a coplanar relation therewith as discussed above. Those arrangements avoid projection of locking mechanism from the upper rail member (U) and permits transmission of operation force along the vertical portion (51) of upper rail member (U) to the lock plate (1). Therefore, the seating level of seat (RS) can be lowered to attain an optimal seating condition as opposed to the prior-art long slide rail with its locking mechanism projecting upwards from the upper rail member. Further, both swing linkage (2) and lock plate (1) are directly attached to the lower rail member (L) without use of any other additional or separate support elements, which simplifies the structure of long slide rail (LRS).

It should be understood that the present invention is not limited to the illustrated embodiments, but any other modifications, replacements and additions may be structurally applied thereto without departing from the scopes of the appended claims. For example, all the horizontal portions (50a)(50b) of upper rail member (U) may be formed together to form one unitary horizontal portion, except for a region corresponding to the cut-away region (51b) where the guide member (3) is slidably fitted.

What is claimed is:

1. A long slide rail for use in a vehicle seat, comprising:
    an elongated lower rail means to be fixed on a floor of a vehicle;
    an upper rail means to be fixed to the vehicle seat, said upper rail means including a vertical portion slidably fitted in said elongated lower means, said vertical portion having an upper edge;
    a locking means for locking and unlocking said upper rail means relative to said elongated lower rail means, said locking means including:
        a lock plate means movable vertically in said vertical portion of said upper rail means so as to lockingly engage and disengage from said elongated lower rail means;
        a swing linkage means provided along a longitudinal direction of said upper rail means and alongside of said vertical portion of the same upper rail means;
        said swing linkage means having:
            a center of rotation pivoted to said vertical portion;
            a first end portion engaged to said lock plate means; and
            a second end portion provided with a guide means slidably attached over said vertical portion and upper edge associated with said upper rail means;

wherein, rotating said second end portion causes said first end portion to swing vertically along a vertical direction of said upper rail means vertical portion, relative to said center of rotation, thereby bringing said lock plate means into and out of a locking engagement with said elongated lower rail means; and a lock control means for controlling and actuating said swing linkage means and lock plate means, said lock control means being operatively and releasably connected with said second end portion of said swing linkage means.

2. The long slide rail as defined in claim 1, wherein said swing linkage means comprises a straight extending swing linkage which is disposed alongside of and pivotally connected to said vertical portion of said upper rail means.

3. The long slide rail according to claim 1, wherein said vertical portion of said upper rail means is formed with a guide spacing in the vertical direction thereof, and wherein said lock plate means is so slidably fitted in said guide spacing as to be movable vertically therealong for the locking engagement with and unlocking disengagement from said elongated lower rail means.

4. The long slide rail according to claim 3, wherein said lock plate means has a thickness equal to that of said vertical portion of said upper rail means such as to establish a coplanar relation therewith.

5. The long slide rail according to claim 1, wherein said upper rail means further includes a horizontal portion extending continuously from said upper edge of said vertical portion associated with said upper rail means, said horizontal portion to be connected with said vehicle seat, and wherein a cut-away portion is formed in said upper edge in such a configuration to permit said second end portion of said swing linkage means to be vertically movable between said horizontal portion and said cut-away portion.

6. The long slide rail as defined in claim 1, wherein said lock control means is disposed at said vehicle seat and includes: an actuator means operatively and releasably connected with said second end portion of said swing linkage means; and an operation knob disposed adjacent to said vehicle seat, said operation knob being interlocked with said actuator means.

7. The long slide rail according to claim 1, wherein a cut-away region is formed in said upper edge of said vertical portion associated with said upper rail means, wherein said guide means comprises a guide member of a generally inverted U-shaped cross-section which has an upper wall and a pair of lateral walls, and wherein said guide member is slidably fitted over said cut-away region, such that said upper wall of the guide member is situated below said upper edge of said vertical portion when said lock plate means is set in the locking engagement with said elongated lower rail means.

8. The long slide rail according to claim 7, wherein said guide member is slidably fitted over said cut-away region, with such an arrangement that said upper wall of said guide member is situated below said upper edge of said vertical portion when said lock plate means is normally set in the locking engagement with said elongated lower rail means, whereas, when said lock plate is brought out of the locking engagement with said elongated lower rail means, said upper wall of said guide member is contacted with said upper edge of said vertical portion to limit a further excessive movement of said lock plate means above said upper edge of said vertical portion.

9. The long slide rail according to claim 8, wherein a biasing means is interposed between said upper wall of said guide member and said upper edge of said vertical portion so as to normally bias said swing linkage means towards a direction in which said another end portion of said swing linkage means is swung to cause the locking engagement of said lock plate means with said elongated lower rail means.

10. The long slide rail according to claim 1, wherein said upper rail means includes a horizontal portion extending horizontally from said vertical portion of said upper rail means, wherein a guide spacing is formed in said vertical portion, in which guide spacing, said locking plate means is slidably fitted, wherein said lock plate means has an upwardly projected portion connectable with said lock control means, and wherein said horizontal portion of said upper rail means has an extension area formed with a guide hole in which said upwardly projected portion of said lock plate means is supportively slidably fitted.

11. The long slide rail according to claim 1, wherein said guide means has a side defined above said second end portion of said swing linkage means, and wherein said lock control means is disposed at said vehicle seat and includes: an actuator means to be operatively contacted with said side of said guide means; wherein an operation knob disposed adjacent to said vehicle seat, said operation knob being interlocked with said actuator means.

12. The long slide rail according to claim 1, wherein a biasing means is provided between said second end portion of said swing linkage means and said upper edge of said vertical portion associated with said upper rail means, so as to normally bias said swing linkage means towards a direction in which said second end portion of the swing linkage means is swung to cause the locking engagement of said lock plate means with said elongated lower rail means.

* * * * *